United States Patent
Kamikubo

(10) Patent No.: US 6,178,029 B1
(45) Date of Patent: Jan. 23, 2001

(54) MULTI-BEAM SCANNING OPTICAL DEVICE

(75) Inventor: Junji Kamikubo, Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/441,551

(22) Filed: Nov. 17, 1999

(30) Foreign Application Priority Data

Nov. 20, 1998 (JP) ................................................. 10-331301

(51) Int. Cl.[7] .................................................. G02B 26/08
(52) U.S. Cl. .......................... 359/204; 347/235; 250/236; 358/475
(58) Field of Search ............................. 359/204; 347/233, 347/235, 241; 358/474, 475, 480, 505; 250/236

(56) References Cited

U.S. PATENT DOCUMENTS

| | | | |
|---|---|---|---|
| 4,950,889 | * 8/1990 | Budd et al. ........................... | 347/235 |
| 5,452,119 | 9/1995 | Morimoto et al. . | |
| 5,543,955 | 8/1996 | Yamazaki et al. . | |
| 5,684,524 | 11/1997 | Hokamura . | |
| 5,760,944 | 6/1998 | Minakuchi et al. . | |
| 5,793,036 | 8/1998 | Minakuchi . | |
| 5,825,522 | 10/1998 | Takano et al. . | |
| 5,844,592 | 12/1998 | Iizuka . | |
| 5,883,657 | 3/1999 | Minakuchi . | |
| 5,883,731 | 3/1999 | Kaski . | |
| 5,943,086 | * 8/1999 | Watabe et al. ........................ | 347/235 |
| 5,966,231 | * 10/1999 | Bush et al. ........................... | 359/204 |

* cited by examiner

Primary Examiner—Darren Schuberg
(74) Attorney, Agent, or Firm—Greenblum & Bernstein, P.L.C.

(57) ABSTRACT

A multi-beam scanning optical device, includes a plurality of light sources, a scanning optical system that scans a scanned surface with the beams emitted from the light sources, a beam detecting sensor that detects scanning timings of respective scanning beams at upstream of a drawing area, a controller that modulates the respective beams from the light sources, and a compensation optical element that has dispersion to vary a deviation angle according to a wavelength of light. The controller starts to modulate each of the beams per scan after predetermined time interval when the beam detecting sensor detects the scanning timing. The compensation optical element is located on an optical path of the scanning beams to adjust incident timings of the scanning beams onto the beam detecting sensor.

8 Claims, 3 Drawing Sheets

MULTI-BEAM SCANNING OPTICAL DEVICE

BACKGROUND OF THE INVENTION

The present invention relates to a scanning optical device such as a laser beam printer. Particularly, the present invention relates to a multi-beam scanning optical device that forms a plurality of scanning lines per scan.

The multi-beam scanning optical device deflects beams by a polygonal mirror emitted from light sources such as laser diodes, and converges the beam to form a plurality of spots on a scanned surface such as a surface of a photoconductive drum, through an fθ lens (scanning lens). The beam spots formed on the scanned surface move (i.e., scan) on the scanned surface in a predetermined scanning direction as the polygonal mirror rotates. The scanning optical device is provided with a beam detecting sensor that detects scanning timings of respective scanning beams at upstream of a drawing area. A controller starts to modulate each of the beams per scan after predetermined time interval when the beam detecting sensor detects the scanning timing. The beams are independently modulated according to drawing data such that the beam spots form a plurality of scanning lines per scan.

In this specification, the direction in which the beam spot scans on the scanned surface is referred to as a main scanning direction. Further, a direction perpendicular to the main scanning direction on the image plane is referred to as an auxiliary scanning direction. The orientations of the shape and the refractive power of optical elements are defined with reference to the directions on the image plane.

In a scanning optical system employed in the multi-beam scanning optical device, drawing start positions, from which the scanning beam spots contribute to image formation, and drawing complete positions, which are the ends of the image portion on the scanning line, should be coincident with one another to keep drawing accuracy.

In the multi-beam scanning optical device, generally, wavelengths of the beams emitted by the plurality of laser diodes distribute. Namely, there is variability in an emission wavelength of a laser diode. Additionally, the fθ lens is not compensated in a chromatic aberration in general, because the fθ lens is used for the predetermined design wavelength. Therefore, the distribution of the wavelength of the beams changes the width of the drawing area between a plurality of lines. Furthermore, the chromatic aberration of the fθ lens changes the detected timing by the beam detecting sensor when the wavelength is different from the design wavelength.

When the wavelength is larger than the design wavelength, the refractive power of the fθ lens decreases, which enlarges the width of the drawing area and delays the detected timing by the beam detecting sensor. Alternatively, when the wavelength is smaller than the design wavelength, the refractive power of the fθ lens increases, which reduces the width of the drawing area and moves up the detected timing by the beam detecting sensor.

As a result, the variation of the wavelength of the beams shifts the drawing area between a plurality of lines, which deteriorates the quality of formed image.

FIG. 5 is a timing chart showing the drawing start and complete timings for two beam spots formed by beams having different wavelength. The timing charts is described on the assumption that two beams are simultaneously deflected by the polygonal mirror to form adjacent scanning lines on the scanned surface and two beam spots scan the same position in the main scanning direction when the wavelength of the two beams are identical.

In FIG. 5, a first beam spot $B_1$ formed by a beam in the design wavelength $\lambda_0$ passes the beam detecting sensor at timing $t_1$ and then after a predetermined time interval $\Delta t_1$, the first beam spot $B_1$ reaches the drawing start timing $t_3$. After a predetermined time interval $\Delta t_2$ from the timing $t_3$, the first beam spot $B_1$ reaches the drawing complete timing $t_5$.

A second beam spot $B_2$ formed by the beam in the wavelength $\lambda_1$ ($\lambda_0 < \lambda_1$) passes the beam detecting sensor at timing $t_2$ with a little delay from the timing $t_1$. After the predetermined time interval $\Delta t_1$, the second beam spot $B_2$ reaches the drawing start timing $t_4$. After a predetermined time interval $\Delta t_2$ from the timing $t_4$, the second beam spot $B_2$ reaches the drawing complete timing $t_5$.

The time intervals $\Delta t_1$ and $\Delta t_2$ are identical for the two beam spots $B_1$ and $B_2$, only the timings of the second beam spots $B_2$ are delayed from the timings of the first beam spot $B_1$. The timing shift described in FIG. 5 appears as the shift of the drawing areas in consideration of the width variation of the drawing area.

FIG. 6 is a chart showing positions of the beam spots $B_1$ and $B_2$. The first beam spot $B_1$ starts the drawing at the intended drawing start position $P_1$ and then finishes at the intended drawing complete position $P_2$. On the other hand, the second beam $B_2$ starts the drawing at a position $P_4$ that is shifted downstream from the intended drawing start position $P_1$ and then finishes at a position $P_5$ that is largely shifted downstream from the intended drawing complete position $P_2$. The drawing area of the first beam spot $B_1$ is an area between the drawing start position $P_1$ and the drawing complete position $P_2$, that for the second beam spot $B_2$ is defined as an area between the positions $P_4$ and $P_5$. References $P_3$ and $P_6$ show the centers of the drawing areas for the first and second beam spots, respectively.

The drawing start timing $t_4$ of the second beam spot $B_2$ is delayed from the drawing start timing $t_3$ of the first beam spot $B_1$, which shifts the drawing start position of the second beam spot $B_2$ in the downstream direction with respect to that of the first beam spot $B_1$, because the deflection angle formed by the polygonal mirror varies. On the contrary, the lateral chromatic aberration of the fθ lens enlarges the drawing area for the second beam spot $B_2$ as compared with that of the first beam spot $B_1$, which shifts the drawing start position of the second beam spot $B_2$ in the upstream direction with respect to that of the first beam spot $B_1$. As a result, the drawing start position $P_4$ of the second beam spot $B_2$ is slightly shifted downstream with respect to the intended drawing start position $P_1$.

At the drawing complete position, since both of the delay of the timing and the shift due to the literal chromatic aberration shifts the drawing complete position of the second beam spot $B_2$ in the downstream direction with respect to that of the first beam spot $B_1$, the drawing complete position $P_5$ is largely shifted downstream with respect to the intended drawing complete position $P_2$.

Thus the drawing area of the second beam spot $B_2$ is shifted downstream with respect to the intended drawing area. Particularly, the deviation of the beam spot at the side of the drawing complete position becomes significant, which deteriorates the quality of formed image.

A use of an achromatic fθ lens solves the above described problem. However, since the achromatic fθ lens requires a combination of lens elements having different dispersion, the number of lens elements of the fθ lens increases when compared with a case where the chromatic aberration is not corrected, which increases the cost of the device.

SUMMARY OF THE INVENTION

It is therefore an object of the invention to provide an improved multi-beam scanning optical device that can reduce deviations of the drawing area due to uneven wavelengths without employing an achromatic scanning optical system.

For the above object, according to the invention, there is provided an improved multi-beam scanning optical device, including:

a plurality of light sources;

a scanning optical system that scans a scanned surface with the beams emitted from the light sources;

a beam detecting sensor that detects scanning timings of respective scanning beams at upstream of a drawing area;

a controller that modulates the respective beams from the light sources, the controller starting to modulate each of the beams per scan after predetermined time interval when the beam detecting sensor detects the scanning timing; and a compensation optical element that has dispersion to vary a deviation angle according to a wavelength of light, the compensation optical element being located on an optical path of the scanning beams to adjust incident timings of the scanning beams onto the beam detecting sensor.

With this construction, the compensation optical element compensates deviation of the beam position due to the lateral chromatic aberration of the scanning optical system when the scanning beams are detected by the beam detecting sensor. Therefore, the incident timings of the beams can be adjusted by the compensation optical element, which can match the drawing start timing, reducing shifts of the drawing areas without using an achromatic scanning optical system.

Preferably, the compensation optical element should have dispersion such that a time interval between the detected timings by the beam detecting sensor becomes constant regardless of the difference in wavelength of the scanning beams.

When the scanning beams at the design wavelength scan the same position in the main scanning direction, the compensation optical element should have dispersion such that the scanning beam at a design wavelength and the scanning beam at different wavelength from the design wavelength are simultaneously detected by the beam detecting sensor.

The compensation optical element may be a prism that refracts the scanning beams in the direction opposite to the scanning direction of the beams or a diffraction grating that diffracts the scanning beams in the scanning direction of the beams.

Further, the scanning optical system may include a deflector that deflects beams emitted from the light sources, and a scanning lens having positive refractive power for converging the beams deflected by the deflector onto the scanned surface.

DETAILED DESCRIPTION OF THE EMBODIMENTS

A multi-beam scanning optical device according to an embodiment of the invention will be described with reference to the accompanying drawings.

Figure 1:
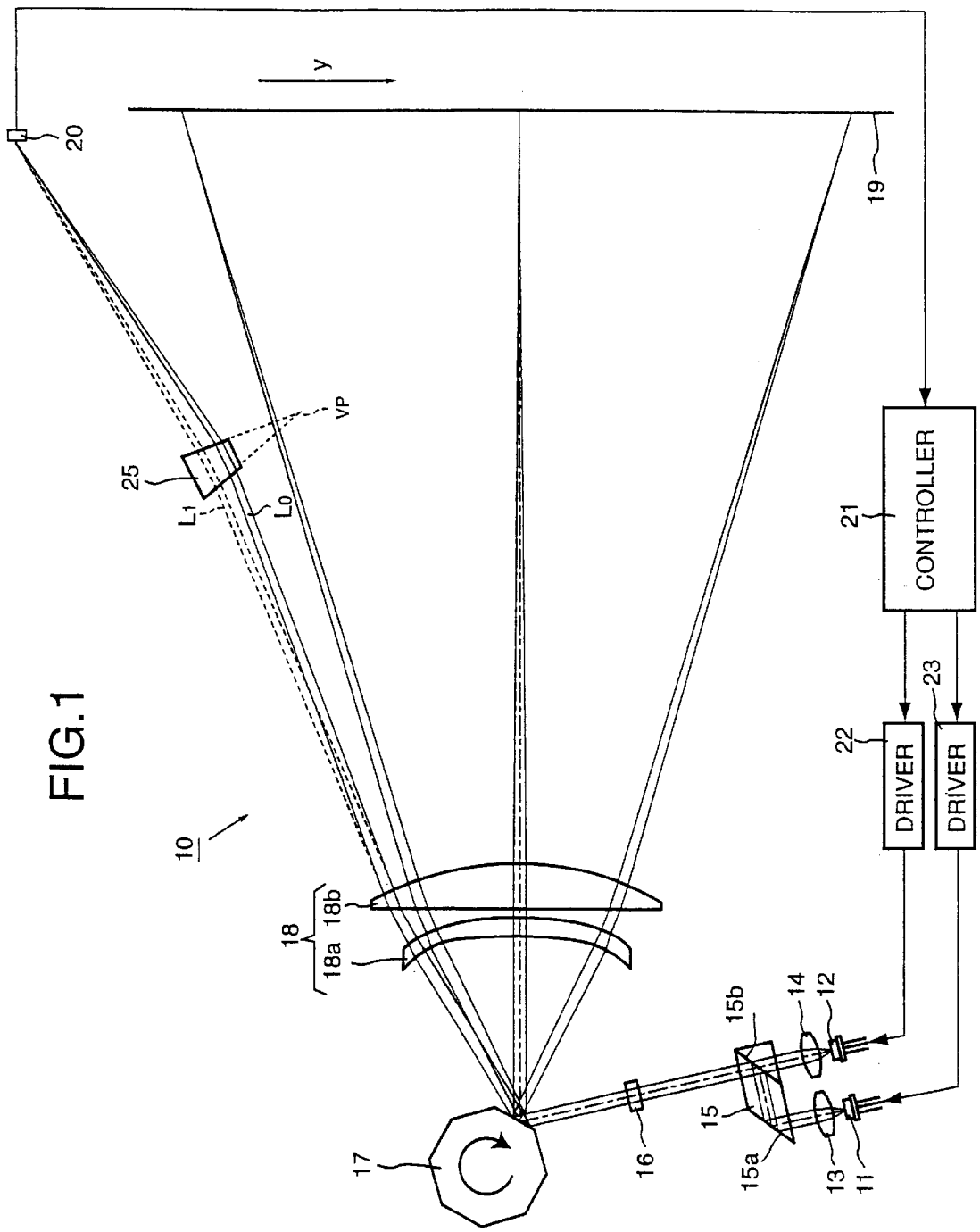
FIG. 1 shows an optical system and a controlling stem of the multi-beam scanning optical device in the mai scanning direction, according to an embodiment.

FIG. 1 shows an optical system and a controlling system of the multi-beam scanning optical device 10 in the main scanning direction (indicated by arrow y in FIG. 1).

The multi-beam scanning optical device 10 has a pair of laser diodes 11 and 12 as light sources. Laser beams emitted from the laser diodes 11 and 12 are collimated into parallel beams by collimator lenses 13 and 14, respectively. A pair of parallel beams are incident on a beam combining prism 15. The beam combining prism 15 has a pair of reflection surfaces 15a and 15b for reflecting the beam from the laser diode 11such that the beams are coincident in the main scanning direction and apart in the auxiliary scanning direction.

The scanning optical device 10 is further provided with a scanning optical system that includes a polygonal mirror 17 as a deflector and an fθ lens 18 as a scanning lens. The beams combined by the beam combining prism 15 are projected onto a reflection surface of the polygonal mirror 17 through a cylindrical lens 16 having positive power only in the auxiliary scanning direction. Therefore, the parallel beams are converged in the auxiliary scanning direction to form linearly extending images on a plane closely adjacent to reflection surfaces of the polygonal mirror 17. The polygonal mirror 17 is driven by a motor (not shown) in the clockwise direction in FIG. 1.

The laser beams incident on the polygonal mirror 17 are deflected by the reflection surfaces of the polygonal mirror 17, and substantially circular beam spots are formed on a scanned surface 19 such as a surface of a photoconductive drum through the fθ lens 18. The beam spots scan the scanned surface 19 with the predetermined distance in the auxiliary scanning direction to form adjacent scanning lines.

The fθ lens 18 includes a first lens 18a and a second lens 18b that are arranged in this order from the polygonal mirror side. The lens surfaces of the first lens 18a are modified toric surfaces. The modified toric surface is defined as a locus when the non-circular arc curve is rotated about an axis of rotation. The non-circular arc curve is included in a main scanning plane that includes the optical axis and is parallel to the main scanning direction. The axis of rotation is perpendicular to the optical axis and is parallel to the main scanning direction. The polygonal mirror side surface of the second lens 18b is a cylindrical surface having negative power in the auxiliary scanning direction, and the image side surface of the second lens 18b is a toric surface having an axis of rotation in the auxiliary scanning direction.

The controlling system includes a beam detecting sensor 20 that detects scanning timings of respective scanning beams at upstream of a drawing area and a controller 21 that modulates the respective laser diodes 11 and 12 through drivers 22 and 23. The beam detecting sensor 20 is located at an optically equivalent position with the scanned surface 19. The beam detecting sensor 20 outputs two pulses per scan. The controller 21 starts to modulate each of the laser diodes 11 and 12 per scan after predetermined time interval when the beam detecting sensor 20 outputs the corresponding pulse. The beams are independently modulated according to drawing data such that the beam spots form a pair of scanning lines per scan.

It should be noted that the controller 21 may control a modulator such as an AOM (acoustooptic modulator) when a gas laser is used as a light source.

On an optical path of the scanning beams, a compensation prism 25 as a compensation optical element is located such that the compensation prism 25 refracts the scanning beams in the direction opposite to the scanning direction y. The compensation prism 25 has a trapezoidal shape in the main scanning plane such that an apex part of a wedge prism (shown in dashed line) is cut out. A reference VP indicates a virtual apex of the wedge prism. The refractive index of the compensation prism 25 decreases as the wavelength of the beam increases, which reduces the deviation angle of the compensation prism 25.

In FIG. 1, the scanning beam $L_1$ at the design wavelength $\lambda_0$ is shown by solid line and the scanning beam $L_2$ at the wavelength $\lambda_1$ ($\lambda_0 < \lambda_1$) is represented by dashed line.

Since the fθ lens 18 is not corrected in chromatic aberration, the scanning beam $L_2$ makes larger angle with an optical axis of the fθ lens 18 than the scanning beam $L_1$. Then the absence of the compensation prism 25 causes differences in the timings detected by the beam detecting sensor 20.

The compensation prism 25 has dispersion to vary a deviation angle according to a wavelength of light to adjust incident timings of the scanning beams onto the beam detecting sensor 20. Namely, the refractive index and the apex angle of the compensation prism 25 are determined such that a time interval between the detected timings by the beam detecting sensor becomes constant regardless of the difference in wavelength of the scanning beams. In this embodiment, the time interval should be zero, the compensation prism 25 is designed so that the scanning beams $L_1$ and $L_2$ are simultaneously detected by the beam detecting sensor 20.

In the other words, the compensation prism 25 compensates deviation of the beam position due to the lateral chromatic aberration of the fθ lens 18 when the scanning beams $L_1$ and $L_2$ are detected by the beam detecting sensor 20. Therefore, the incident timings of the beams can be coincident with each other by the compensation prism 25, which can match the drawing start timing, reducing shifts of the drawing areas.

Figure 2:
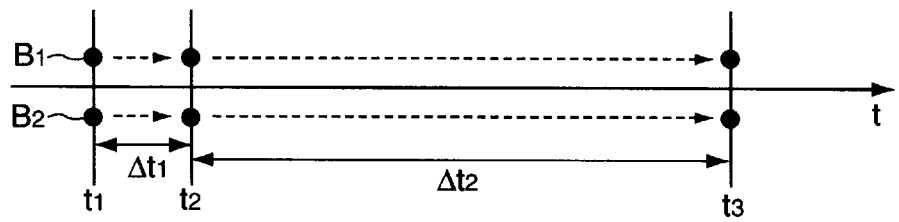
FIG. 2 is a timing chart showing the drawing start and complete timings for two beam spots formed by beams having different wavelength in the scanning optical device of FIG. 1.

FIG. 2 is a timing chart showing the drawing start and complete timings for two beam spots formed by beams having different wavelength.

In FIG. 2, a first beam spot $B_1$ formed by the beam $L_1$ in the design wavelength $\lambda_0$ passes the beam detecting sensor at timing $t_1$ and then after a predetermined time interval $\Delta t_1$, the first beam spot $B_1$ reaches the drawing start timing $t_2$.

After a predetermined time interval $\Delta t_2$ from the timing $t_2$, the first beam spot $B_1$ reaches the drawing complete timing $t_3$.

A second beam spot $B_2$ formed by the beam $L_2$ in the wavelength $\lambda_1$ passes the beam detecting sensor at the same timing $t_1$ as the first beam spot $B_1$. Since the drawing start timing and the drawing complete timing are determined by the time intervals $\Delta_1$ and $\Delta t_2$, the second beam spot $B_2$ reaches the drawing start timings $t_2$ and the drawing complete timing $t_3$ as well as the first beam spot $B_1$.

The coincidence of the timings matches the centers of the drawing areas with each other.

Figure 3:
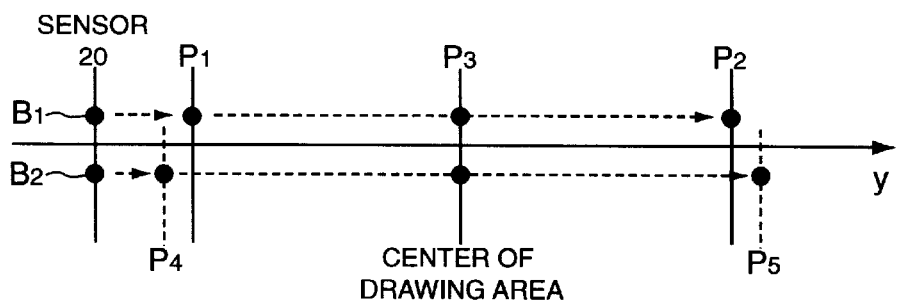
FIG. 3 is a chart showing positions of beam spots formed by beams having different wavelength in the scanning optical device of FIG. 1.

FIG. 3 is a chart showing positions of the beam spots $B_1$ and $B_2$. The first beam spot $B_1$ starts the drawing at the intended drawing start position $P_1$ and then finishes at the intended drawing complete position $P_2$. On the other hand, the second beam $B_2$ starts the drawing at a position $P_4$ that is shifted upstream from the intended drawing start position $P_1$ and then finishes at a position $P_5$ that is shifted downstream from the intended drawing complete position $P_2$. The center position $P_3$ is common for the first and second beam spots.

Since the drawing start timing and the drawing complete timing are the same in the first and second beam spots, only the lateral chromatic aberration of the fθ lens affects the shift of the drawing area. The lateral chromatic aberration of the fθ lens enlarges the drawing area for the second beam spot $B_2$ as compared with that of the first beam spot $B_1$, which shifts the drawing start position of the second beam spot $B_2$ in the upstream direction with respect to that of the first beam spot $B_1$.

At the drawing complete position, the lateral chromatic aberration shifts the drawing complete position of the second beam spot $B_2$ in the downstream direction with respect to that of the first beam spot $B_1$.

The difference of the width of the drawing areas formed by the first and second beam spots in the embodiment is the same as that in the prior art. However, the deviation of the beam spots significantly appears in the side of the drawing complete position in the prior art, which deteriorates the quality of formed image. On the other hand, the deviation of the beam spots is distributed in both sides of the drawing start position and the drawing complete position in the embodiment, which avoids the significant deviation as in the prior art, increasing the quality of formed image.

Numerical constructions of the embodiment will be described hereinafter. The following Table 1 shows the lens arrangement of the scanning optical system according to the embodiment on the scanned surface side with respect to the cylindrical lens 16.

Symbol f in the table represents a focal length of the fθ lens 18 in the main scanning direction, SW is a scan width on the scanned surface 19, ω is the maximum scan angle, ry is a radius of curvature (unit: mm) in the main scanning direction, rz is a radius of curvature (unit: mm) in the auxiliary scanning direction (which will be omitted if a surface is a rotationally symmetric surface), d is a distance (unit: mm) between surfaces along the optical axis, and n is a refractive index at the design wavelength, i.e., 780 nm.

In Table 1, surfaces #1 and #2 define the cylindrical lens 16, a surface #3 represents the light reflection surface of the polygonal mirror 17, surfaces #4 and #5 define the first lens 18a, and surfaces #6 and #7 define the second lens 18b.

TABLE 1 f = 200.0 mm    SW = 216 mm    ω = 30.9°

| Surface Number | ry | rz | d | n |
|---|---|---|---|---|
| #1 | ∞ | 30.000 | 4.000 | 1.51072 |
| #2 | ∞ | — | 57.040 | |
| #3 | ∞ | — | 47.000 | |
| #4 | 2000.000 | −343.500 | 5.000 | 1.48617 |
| #5 | −1000.000 | 500.000 | 2.500 | |
| #6 | ∞ | −56.890 | 12.000 | 1.51072 |
| #7 | −118.570 | −17.500 | 198.320 | |

The radius of curvature of each of the modified toric surfaces indicated in Table 1 is a value on the optical axis. The non-circular arc curve that defines the modified toric surface is defined as the following equation.

$$X(Y) = \frac{Y^2}{r\left\{1 + \sqrt{1 - \frac{(K+1)^2 Y^2}{r^2}}\right\}} + A4 Y^2 + A6 Y^6 + A8 Y^8 + \cdots$$

X(Y) is a SAG, i.e., a distance corresponding to a point on the non-circular arc curve with respect to a tangential line at a point where the optical axis intersects the non-circular arc curve, Y is a distance, in the main scanning direction, of the point from the optical axis. Symbol K is a conic constant, r is a radius of curvature on the optical axis, A4, A6 and A8 are aspherical surface coefficients of fourth, sixth and eighth orders. The conic coefficients and the aspherical surface coefficients for respective surfaces are indicated in Table 2.

TABLE 2

| Surface Number | K | A4 | A6 | A8 |
|---|---|---|---|---|
| #4 | 10.00 | −4.730 × 10⁻⁶ | −4.100 × 10⁻¹⁰ | 5.190 × 10⁻¹³ |
| #5 | 25.00 | −3.990 × 10⁻⁶ | −2.500 × 10⁻¹⁰ | 2.410 × 10⁻¹³ |

The center axis of the laser beam from the laser diodes 11 and 12 incident on the polygonal mirror 17 makes 80 degrees with the optical axis of the fθ lens 18 in the main scanning direction.

The position of the beam detecting sensor 20 is 191.44 mm apart from the image side surface #7 of the second lens 18b in the optical axis direction and −140.25 mm apart from the optical axis in the main scanning direction y.

Further, the virtual apex VP of the compensation prism 25 is 120 mm apart from the image side surface #7 of the second lens 18b in the optical axis direction and −60 mm apart from the optical axis in the main scanning direction y. The compensation prism 25 is located such that the angle of the incident side surface 25a forms an angle of 40 degrees with the optical axis of the fθ lens 18. The apex angle of the compensation prism 25 is 20 degrees and the refractive index thereof is 1.51072.

In the above described design, the compensation prism 25 compensates deviation of the beam position due to the lateral chromatic aberration of the fθ lens 18, that is, the deviation between the scanning beams of 780 nm and 800 nm becomes 0 μm on the beam detecting sensor 20. If the compensation prism 25 is removed, the deviation becomes 36 μm.

Figure 4:
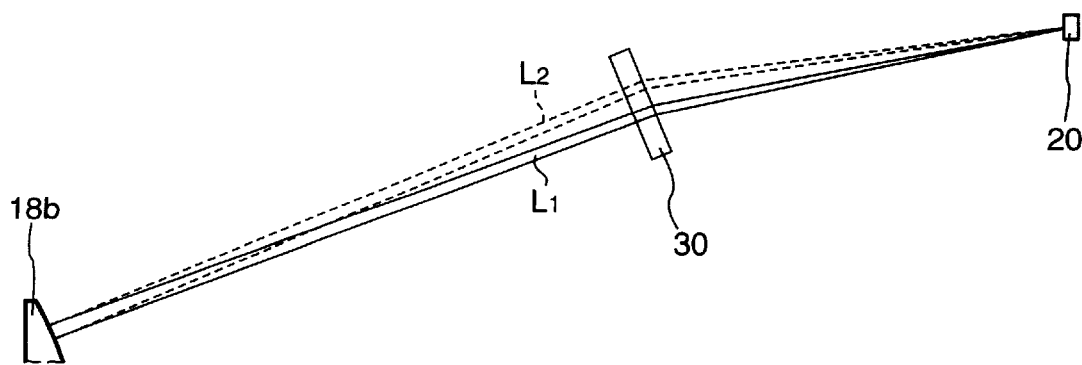
FIG. 4 is a diagram showing an optical function of a diffraction grating as a compensation optical element.
Figure 5:
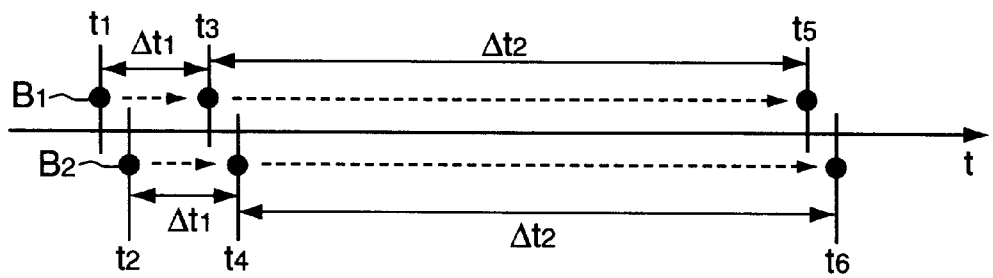
FIG. 5 is a timing chart showing the drawing start and complete timings for two beam spots formed by beams having different wavelength in a conventional scanning optical device.
Figure 6:
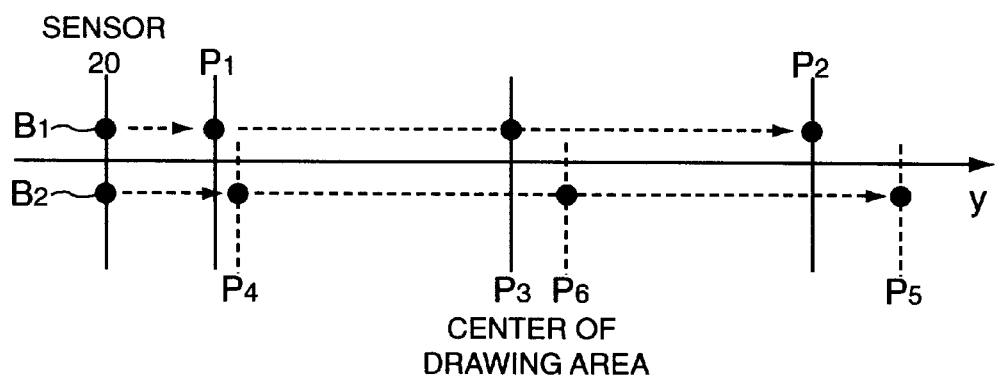
FIG. 6 is a chart showing positions of beam spots formed by beams having different wavelength in the conventional scanning optical device.

A diffraction grating may be used as the compensation optical element in place of the compensation prism 25. FIG. 4 shows an optical function of the diffraction grating 30. Since the diffraction grating 30 has an opposite dispersion to the refractive element, the deviation angle of the diffraction grating 30 increases as the wavelength of the beam increases. Therefore, the diffraction grating 30 is arranged such that it diffracts the scanning beams in the main scanning direction y. The incident timings onto the beam detecting sensor 20 of the beams can be coincident with each other by the diffraction grating 30, which can match the drawing start timing, reducing shifts of the drawing areas.

In the above described embodiment, since the beam spots on the scanned surface 19 scans the same position in the main scanning direction, the two scanning beams are incident on the beam detecting sensor 20 at the same timing. However, the beam spots may scan with delay. In such a case, the compensation optical element is arranged such that a time interval between the detected timings by the beam detecting sensor 20 becomes constant regardless of the difference in wavelength of the scanning beams.

The present disclosure relates to subject matter contained in Japanese Patent Application No. HEI 10-331301, filed on Nov. 20, 1998, which is expressly incorporated herein by reference in its entirety.

What is claimed is:

1. A multi-beam scanning optical device, comprising:
   a plurality of light sources;
   a scanning optical system that scans a scanned surface with the beams emitted from said light sources;
   a beam detecting sensor that detects scanning timings of respective scanning beams at upstream of a drawing area;
   a controller that modulates the respective beams from said light sources, said controller starting to modulate each of said beams per scan after predetermined time interval when said beam detecting sensor detects said scanning timing; and
   a compensation optical element that has dispersion to vary a deviation angle according to a wavelength of light, said compensation optical element being located on an optical path of said scanning beams to adjust incident timings of said scanning beams onto said beam detecting sensor.

2. The multi-beam scanning optical device according to claim 1, wherein said compensation optical element has dispersion such that a time interval between the detected timings by said beam detecting sensor becomes constant regardless of the difference in wavelength of the scanning beams.

3. The multi-beam scanning optical device according to claim 1, wherein said compensation optical element has dispersion such that said scanning beam at a design wavelength and said scanning beam at different wavelength from said design wavelength are simultaneously detected by said beam detecting sensor.

4. The multi-beam scanning optical device according to claim 1, wherein said compensation optical element is a prism that refracts said scanning beams in the direction opposite to the scanning direction of the beams.

5. The multi-beam scanning optical device according to claim 1, wherein said compensation optical element is a diffraction grating that diffracts said scanning beams in the scanning direction of the beams.

6. The multi-beam scanning optical device according to claim 1, wherein said s canning optical system includes:
   a deflector that deflects beams emitted from said light sources; and a scanning lens having positive refractive power for converging the beams deflected by said deflector onto said scanned surface.

7. A multi-beam scanning optical device, comprising:

a plurality of light sources;

a scanning optical system that scans a scanned surface with the beams emitted from said light sources;

a beam detecting sensor that detects scanning timings of respective scanning beams at upstream of a drawing area;

a controller that modulates the respective beams from said light sources, said controller starting to modulate each of said beams per scan after predetermined time interval when said beam detecting sensor detects said scanning timing; and a prism that refracts said scanning beams in the direction opposite to the scanning direction of the beams to adjust incident timings of said scanning beams onto said beam detecting sensor.

8. A multi-beam scanning optical device, comprising:

a plurality of light sources;

a scanning optical system that scans a scanned surface with the beams emitted from said light sources;

a beam detecting sensor that detects scanning timings of respective scanning beams at upstream of a drawing area;

a controller that modulates the respective beams from said light sources, said controller starting to modulate each of said beams per scan after predetermined time interval when said beam detecting sensor detects said scanning timing; and a diffraction grating that diffracts said scanning beams in the scanning direction of the beams to adjust incident timings of said scanning beams onto said beam detecting sensor.

* * * * *